(12) United States Patent
Powar

(10) Patent No.: US 6,285,991 B1
(45) Date of Patent: Sep. 4, 2001

(54) SECURE INTERACTIVE ELECTRONIC ACCOUNT STATEMENT DELIVERY SYSTEM

(75) Inventor: William L. Powar, Palo Alto, CA (US)

(73) Assignee: Visa International Service Association, Foster City, CA (US)

( * ) Notice: Subject to any disclaimer, the term of this patent is extended or adjusted under 35 U.S.C. 154(b) by 0 days.

(21) Appl. No.: 08/766,498

(22) Filed: Dec. 13, 1996

(51) Int. Cl.⁷ ................. H04L 9/32; G06F 17/60

(52) U.S. Cl. ............... 705/76; 705/78; 705/40; 713/156; 713/175

(58) Field of Search .................. 380/23, 24, 30, 380/49, 277; 705/40, 26, 14, 76, 77, 34; 713/105–159

(56) References Cited

U.S. PATENT DOCUMENTS

| | | | |
|---|---|---|---|
| 5,007,084 | 4/1991 | Materna et al. ............... 380/24 |
| 5,193,055 | 3/1993 | Brown et al. . | |
| 5,214,702 | * 5/1993 | Fischer ........................ 380/30 |
| 5,337,360 | 8/1994 | Fischer . | |
| 5,383,113 | 1/1995 | Kight et al. ................ 705/40 |
| 5,465,206 | 11/1995 | Hilt et al. ................... 705/40 |
| 5,557,518 | 9/1996 | Rosen . | |
| 5,699,528 | * 12/1997 | Hogan ........................ 395/240 |
| 5,748,738 | * 5/1998 | Bisbee et al. .............. 380/25 |
| 5,794,210 | * 8/1998 | Goldhaber et al. ........ 705/14 |
| 5,832,460 | * 11/1998 | Bednar et al. .............. 705/27 |
| 5,848,397 | * 12/1998 | Marsh et al. ............... 705/14 |
| 5,848,400 | * 12/1998 | Chang ........................ 705/35 |
| 5,867,578 | * 2/1999 | Brickell et al. ............. 380/23 |

FOREIGN PATENT DOCUMENTS 328232 8/1989 (EP) .

OTHER PUBLICATIONS

Bellare et al, "iKP—A Family of Secure Electronic Payment Protocols", First USENIX Workshop on Electronic Commerce, USENIX Association, Jul. 11–12, 1995, paper dated Aug. 2, 1995; pp. 89–106, see pp. 94 and 96.

(List continued on next page.)

*Primary Examiner*—Gilberto Barron, Jr.
(74) *Attorney, Agent, or Firm*—Beyer Weaver & Thomas, LLP

(57) ABSTRACT

The present invention consists of a secure interactive electronic account statement delivery system suitable for use over open networks such as the Internet. The invention utilizes a certification hierarchy to insure that electronic bills, invoices, and other account statements can be securely sent over open networks. The participants in the system are a certification authority, certificated banks, billers, and customers. The certification authority grants digital certificates to the certificated banks, which in turn grant digital certificates to billers and customers. Digital certificates form the basis for encryption and authentication of network communications, using public and private keys. The certificates associate a customer and biller with a certificated bank and with the electronic billing system, much like payment cards associate a customer with a payment card issuer and a particular payment card system. Digital signatures are used for authentication and non-repudiation. The certificates may be stored as digital data on storage media of a customer's or biller's computer system, or may be contained in integrated circuit or chip cards physically issued to billers and customers. The electronic bill itself may be a simple text message containing the equivalent of summary information for the bill, or may be more elaborate. In one embodiment of the invention, the electronic bill contains a number of embedded links, for example an embedded URL of a biller's world wide web server that allows the customer to interactively bring up detailed billing information by activating the link. The e-mail message may also include links to third party websites.

69 Claims, 12 Drawing Sheets

OTHER PUBLICATIONS

Written Opinion of IPEA/US, WIPO dated Mar. 2, 1999.

Kolletzki S: "Secure Internet banking with Privacy Enhanced Mail—A Protocol for reliable exchang eof secured order forms", Computer Networks and ISDN Systems, vol. 14, No. 28, Nov. 1996, p. 1891–1899 XP004014500.

Sirbu M et al.: "Netbill: An Internet Commerce System Optimized for Network Delivered Services", Digest of Papers of the Computer Society Computer Conference (Spring) Compcon, Technologies for the Information Superhighway, San Francisco, Mar. 5–9, 1995, No. Conf. 40, Mar. 5, 1995, Institute of Electrical and Electronics Engineers, pp. 20–25, XP000577034, see figure 3.

"Apply Your Marketing Talent to Promote On–Line Banking", Bank Marketing, May 1, 1996, pp. 25–30, XP000579413, see p. 28.

Secure Electronic Transaction (SET) Specification; Jun. 1996 Draft; Book 1: Business Description.

Secure Electronic Transaction (SET) Specification; Jun. 1996 Draft: Book 2: Programmer's Guide; Book 3: Formal Protocol Specification.

Landis, Ken; The Perfect Passports to Global Electronic Banking; *The Automated Banker*; Oct. 1990 pp. 47–49.

Medvinsky, Gennady and Neuman, B. Clifford; NetCash: A design for practical electronic currency on the Internet; *Association For Computing Machinery*; 1993 pp. 1–5.

Perry, Tekla S.; Electronic Banking goes to market; *IEEE Spectrum*; Feb. 1988 pp. 46–49.

\* cited by examiner

SECURE INTERACTIVE ELECTRONIC ACCOUNT STATEMENT DELIVERY SYSTEM

BACKGROUND OF THE INVENTION

1. Field of the Invention

The present invention relates to the field of electronic billing and paying systems. More particularly, the present invention relates to a secure interactive electronic statement delivery system suitable for use on open networks such as the Internet.

2. Background Art

Every month, millions of customers receive bills and other account statements from utilities, banks, stores, credit card companies, insurance companies, and other service providers. Almost all of these account statements are sent by mail.

A typical bill includes four primary components:

1. Summary information. Typically includes an amount due, a due date, a customer account number, a statement issuer Killer) name and address. The summary information is often printed on a detachable remittance stub that is intended to be returned by the customer with a check for payment.

2. A pre-addressed return envelope.

3. Detailed invoice of charges. Typically includes a detailed listing of the charges accrued. For example, if the account statement is a telephone company bill, the detailed invoice will list details of each toll call. The detailed information may include legally mandated information, particularly if the statement issuer is a public utility. For example, an electric company may be required to list monthly or yearly comparisons of a customer's energy use. The content and format of such legally mandated information may vary from one legal jurisdiction (town, county, state) to another.

4. Marketing materials. Statement issuers typically include information such as newsletters announcing new products or services, and often also include third party advertising pieces.

A customer typically pays a bill by writing a check for the amount due, placing the check and the remittance stub in the return envelope, sealing and stamping the envelope, and placing it in the mail.

For every bill received and paid by a customer, a billing institution (biller) has to perform numerous paper, handling tasks. Fist, the biller has to generate the bill and mail it to the customer. The bill generation process involves retrieving billing data for a customer, formatting the billing data in the legally prescribed manner, printing each customer's bill, placing the bill and other included materials in an envelope, and mailing the envelope to the customer. The biller also has to process the payment remittance received. Remittance processing involves opening envelopes, identifying the customer's account, extracting the check, and presenting the check for payment Given the large volume of bills sent out and payments received each month, the paper handling involved is a massive and expensive undertaking.

Various systems have been proposed to reduce the paper handling involved in bill paying and remittance processing. For example, there exist electronic bill payment service bureaus that allow customers to electronically pay their bills via a home computer or telephone. However, although use of these bureaus make bill paying more convenient for customers, they make remittance processing more expensive for billers because the payments forwarded to the biller by the bureau are exception items for many billers. When using a bill payment service, a customer directs the service bureau to make payments to the biller. As a result, the remittance is not presented to the biller in the usual way, i.e. a check with the biller's remittance stub in a single envelope. Instead, the biller receives payment, without the remittance stub, from the service bureau. The payment itself, depending on the practice used by the service bureau, may take a number of forms. The biller may receive a check printed by the service bureau drawn on the customer's bank account containing the customer's account number with the biller and MICR (Magnetic Ink Character Recognition) data encoding the customer's bank account number. Alternatively, the service bureau may consolidate payments from several. customers to a biller into a single payment. In this case, the biller receives one payment and a list of customers whose bills have been aggregated into the single payment In another automatic bill payment system, a customer pre-authorizes a biller to automatically deduct amounts due from the customer's bank account using the Automated Clearing House ("ACH"). In this case, the biller must comply with ACH procedures for validating and obtaining payments.

U.S. Pat. No. 5,465,206, issued Nov. 7, 1995, for "Electronic Bill Pay System", assigned to the assignee of the present invention and incorporated herein by reference, discloses a bill pay system that allows customers to pay bills to participating billers through a centralized payment network operating according to preset rules. The participating customers receive bills from participating billers which indicate an amount owed and a unique biller identification number, which is assigned by the payment network. The bills may be mailed bills, e-mail notices, or implied bills for automatic debts. To authorize a remittance, a customer transmits to its bank, which is a participating bank, a bill pay order indicating a payment date, a payment amount, the customer's account number with the biller, a source of funds, and the biller's biller identification number. The customer's bank then submits a payment message to a payment network. The payment network forwards the payment message to the biller's bank. For settlement, the customer's bank debits the customer's account and is obligated to a net position with the payment network Likewise, the biller's bank receives a net position from the payment network and credits the biller's bank account. The biller receives payment details from the biller's bank, or alternatively directly from the payment network, and updates its accounts receivable records. The customer initiates bill pay orders manually via paper correspondence, at an ATM, via PC, or via telephone keypad.

Prior art systems have primarily addressed the bill payment portion of customer bill processing. The bill generation and presentation portion of customer bill processing has not yet been satisfactorily addressed. U.S. Pat. No. 5,465,206 suggests that bills may be sent electronically by e-mail, but does not elaborate. U.S. Pat. No. 5,007,084 for "Payment Authorization and Information Device", issued Apr. 9, 1991, describes a home terminal for receiving and printing out billing information. The billing data is simple text data received by the customer via an encoded signal broadcast by a centralized invoice distribution center during vertical blanking intervals of a television broadcast or via telephone lines and a modem. A special device is used to decode and print out a hard copy of the received text. The same device can be used to pay the bill electronically.

The electronic bills delivered by these systems consist of simple text messages. As such, the electronic bills cannot deliver the same variety of information and materials as, and are therefore a poor substitute for, traditional mailed paper bills. Furthermore, these systems require the use of a specialized, centralized distribution network and/or special equipment.

Security is an issue for messages and other data transmitted over open networks such as the Internet. Encryption is one mechanism that can improve the security of transmitted communications. Two well known types of encryption are secret key encryption and public key encryption.

Secret key encryption is a symmetric form of encryption in which the same key is used to encrypt and decrypt messages. To encrypt a message, the message and the secret key are supplied to a software encryption program that transforms the message by means of an encryption routine that uses the secret key and the message as an input The original message can only be obtained from the encrypted message by applying a reverse, decryption process, which transforms the encrypted message by means of a decryption routine that uses the encrypted message and the secret key as an input Because the same secret key is used for encryption and decryption, both the sender and the recipient of the encrypted message must have a copy of the secret key. The security of secret key encryption can therefore be compromised by either the sender or the recipient.

Public key encryption is an asymmetric form of encryption that uses a two-key pair, typically referred to as a public key and a private key. In public key encryption, messages encrypted with either one of the public and private keys can only be decrypted using the other key. For example, a message encrypted with the public key can only be decrypted using the private key. Conversely, a message encrypted with the private key can only be decrypted using the public key.

The terms "public" key and "private" key stem from the manner in which public key encryption is often used. A party concerned about security of its incoming communications generates its public and private keys. It keeps its private key secret, but freely distributes its public key. Any party wishing to send a confidential message to the party that generated the keys can encrypt its message using the freely available public key. Since the message can then only be decrypted using the private key, which the receiving party keeps in its sole possession, the sending party can be assured that only the receiving party will be able to decode the encrypted message.

Another security mechanism that can be used in conjunction with public key encryption is a digital signature. The purpose of a digital signature is to confirm to the recipient that a message that is sent has in fact originated with the purported sender.

One form of digital signature uses a message digest. A message digest is a value that is generated when the message is passed through a digesting program, which may be a hashing routine. An ideal digesting program is one for which the probability of two different messages generating the same message digest is extremely low. In this form of digital signature, both the sender and the recipient need to know which digesting program is being used. The sender generates the message, and generates a message digest by passing the message through the digesting program. The sender encrypts the message digest with the sender's private key. The result of this encryption then becomes the digital signature which the sender appends to a message just as a holographic signature would be added to a paper document. Finally, the sender encrypts the entire package with the recipient's public key, and sends the encrypted package to the recipient.

The recipient receives the encrypted package and decrypts it using the recipient's private key to obtain the message and message digest encrypted with the sender's private key. Next, the sender decrypts the message digest using the sender's public key. The recipient then runs the message, minus message digest, through the digesting program and compares the message digest so obtained to the message digest included in the message. If they are both the same, the recipient is ensured that the message indeed originated with the sender and that it has not been changed en route.

In practice, entire messages are rarely encrypted/decrypted using public keys. Although possible, most algorithms used for public key encryption are computationally intensive. Accordingly, the usual practice is for the sender to generate a secret "session" key that is used in a symmetric encryption algorithm, which is less computationally intensive than a public key algorithm. The sender encrypts the message with the session key, encrypts the session key with the recipients public key, and sends both to the recipient. To retrieve the sender's message, the recipient decrypts the session key with the recipient's private key, and then uses the session key to decrypt the message.

The use of encryption and digital signatures in electronic transactions over the Internet is further described in "Secure Electronics Transaction (SET) Specification, Draft for testing, Jun. 17, 1996" published on the Internet by Visa International at www.visa.com and by Mastercard at www-.mastercard.com.

SUMMARY OF THE INVENTION

The present invention consists of a secure interactive electronic account statement delivery system suitable for use over open networks such as the Internet. The present invention utilizes a certification hierarchy to insure that electronic bills, invoices, and other account statements can be sent over open networks with certainty that they will only be received by the intended recipients. The participants in the system are a certification authority, certificated banks, billers and other service providers, and customers. The certification authority grants digital certificates to the certificated banks, which in turn are authorized to grant digital certificates to billers and customers. Digital certificates form the basis for encryption and authentication of network communications, using the concepts of public and private keys. The certificates associate a customer and biller with a certificated bank and with the electronic billing system, much like payment cards associate a customer with a payment card issuer (typically a bank) and a particular payment card system (e.g. Visa, MastexCard, etc.). Digital signatures are used for authentication and non-repudiation. The certificates may be stored as digital data on storage media of a customer's or biller's computer system, or may be contained in integrated circuit or chip cards physically issued to billers and customers.

To send an account statement such as a bill to a customer in one embodiment of the present invention, the biller and the customer must each have a valid certificate, typically issued by a certificated bank. The biller must know the e-mail address of the customer, as well as the customer's public key. This information may be obtained, for example, from the certification authority, which maintains a file or directory of customer public keys and e-mail addresses, as well as a file or directory of biller public keys and e-mail addresses. The biller sends an e-mail message signed with the biller's digital signature and encrypted using the customer's public key (or using a session key which is encrypted with the customer's public key) to the customer's e-mail address. In one embodiment, the biller includes a copy of the biller's certificate with the e-mail message. In another embodiment, the customer obtains the biller's certificate from a directory maintained by a certification authority or from local storage (if the customer previously obtained the biller's certificate). When the customer retrieves the e-mail message, for example using a home computer, software in the customer's computer decrypts the message using the customer's private key, or using the session key decrypted using the customer's private key, and verifies that the e-mail message is a bona-fide message from a certificated biller by verifying the biller's certificate and digital signature. Since only the customer has access to the customer's private key, only the customer can decrypt and read the e-mail bill. The present invention thus provides a level of privacy and security that is at least as great using regular mail.

The e-mail message itself may be a simple-text message containing the equivalent of summary information for the bill, or may be a more elaborate bill containing detailed text and graphics. However, the bill delivery system of the present invention allows the creation of much more elaborate bills. In one embodiment of the invention, the e-mail message contains a number of embedded links, for example an embedded URL of a biller's world wide web server that allows the customer to interactively bring up detailed billing information at a touch of an on-screen button that activates the link. The e-mail message may also include links to third party web sites offering special product promotions or other services, thereby performing the same function, but with greater flexibility as that performed by marketing materials included in mailed hard-copy bills. The e-mail message may also contain an embedded command to send the biller a confirmation message when the customer first displays the biller's message. Customer certificates and customer digital signatures are used to insure authenticity of communications originated by a customer.

DETAILED DESCRIPTION OF INVENTION

In the following description, numerous specific details are set forth in order to provide a thorough understanding of the present invention. It will be apparent to one skilled in the art, however, that the present invention may be practiced without these specific details. In other instances, well-known features have not been described in detail in order not to unnecessarily obscure the present invention.

Figure 1:
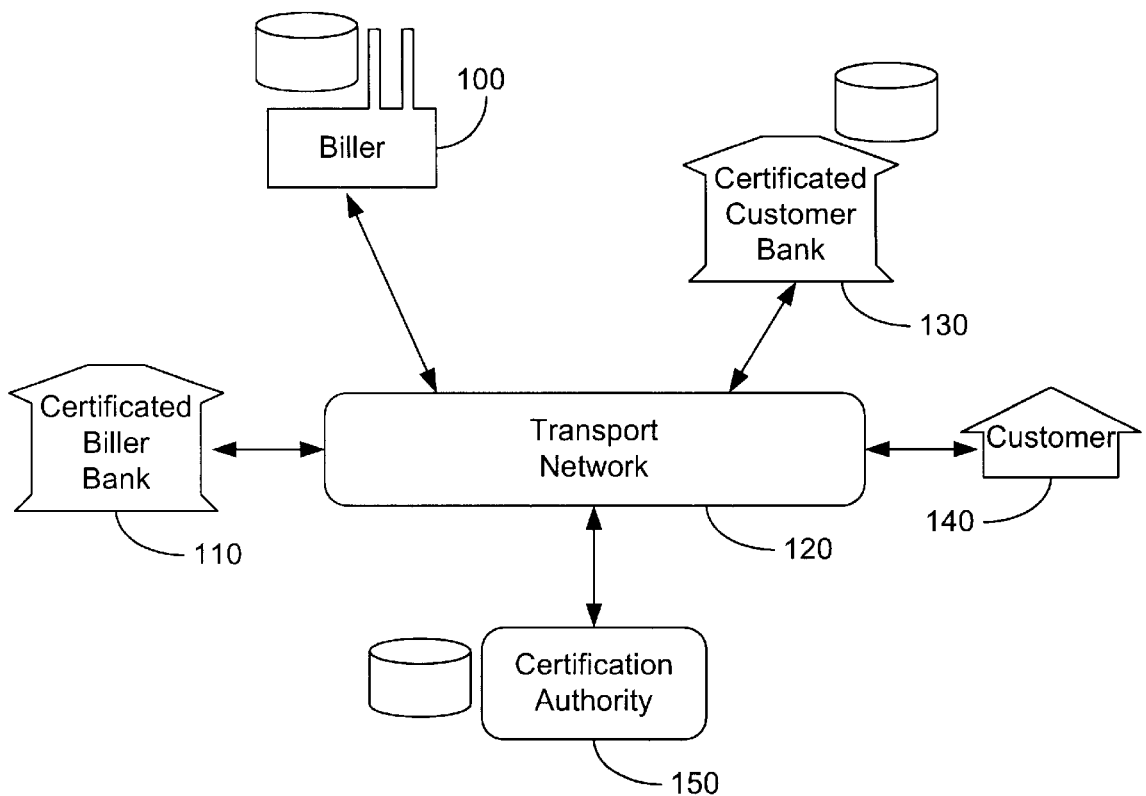
FIG. 1 is a schematic diagram illustrating the topology of one embodiment of the interactive electronic billing system of the present invention.

FIG. 1 shows the topology of one embodiment of an interactive electronic billing system of the present invention. As shown in FIG. 1, this embodiment includes a biller 100, a certificated biller bank 110, a transport network 120, a certificated customer bank 130, a customer 140, and a certification authority 150. Biller 100 may be any of a variety of entities that provide products or services to customer 140 and that provide periodic account statements to customer 140. Examples of entities that may be a biller 100 include utility companies, banks, credit card companies retailers, stockbrokers, etc. Certificated biller bank 110 is a bank that has been certificated by certification authority 150 and that has provided a biller certificate to biller 100. Biller bank 110 may also provide electronic bill payment services to biller 100. Transport network 120 is a data communications network to which biller 100, certificated biller bank 110, certificated customer bank 130, customer 140, and certification authority 150 have access. For example, transport network 120 may be the Internet. Certificated customer bank 130 is a bank or other service provider that has been certificated by certification authority 150 and that has provided a customer certificate to customer 140. Customer bank 130 may also provide electronic bill payment services to customer 140. Customer 140 is any entity that has obtained a customer certificate and is a customer of biller 100. Certification Authority 150 distributes certificates to certificated banks, and may administer the protocols and certificate hierarchy used in the system.

Figure 2:
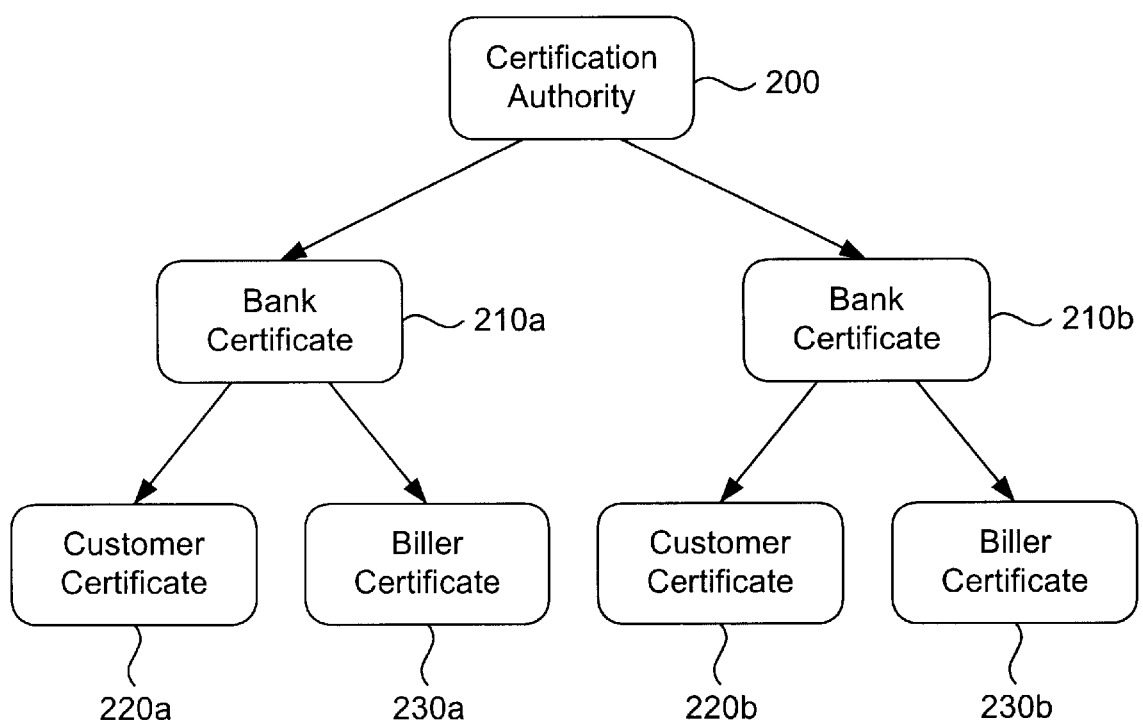
FIG. 2 is a block diagram illustrating the certificate hierarchy used in one embodiment of the present invention.

FIG. 2 is a block diagram illustrating the certificate hierarchy used in one embodiment of the present invention. At the top level of the hierarchy is certification authority 200, which is responsible for overall integrity of the system. Certification authority 200 issues certificates to certificated banks. These certificates are shown as bank certificates 210a and 210b Bank certificates 210a–b constitute the second level of certificates below the top level occupied by certification authority 200.

Certificated banks issue customer certificates and biller certificates to customers and billers, respectively. As shown in FIG. 2, customer certificate 220a and biller certificate 230a are issued under the authority of bank certificate 210a, while customer certificate 220b and biller certificate 230b are issued under authority of bank certificate 210*b*. Customer certificates. 220*a–b* and biller certificates 230*a–b* occupy the same level of the certificate hierarchy shown in FIG. 2. This level is one level below bank certificates 210*a–b*.

Figure 3:
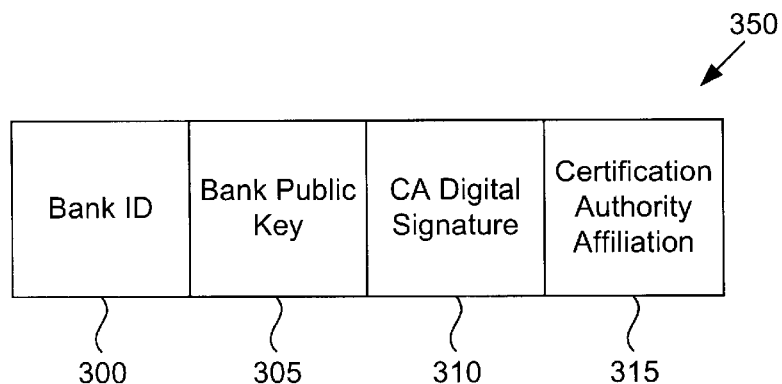
FIG. 3 is a schematic diagram of a bank certificate of one embodiment of the present invention.

A digital certificate of the present invention consists of digital data of a particular form and content, as established by a certification authority. A digital certificate of the present invention may be delivered from the issuer of the certificate to the recipient as an electronic message or in physical form. If delivered in physical form, the digital certificate is stored on a physical medium, for example on a chip card. The chip card is delivered by some secure means to the recipient FIG. 3 illustrates the digital data contained in a bank certificate of one embodiment of the present invention. As shown in FIG. 3, bank certificate 350 includes a bank ID 300, a bank public key 305, a certification authority digital signature 310, and a certification authority affiliation 315.

Bank ID 300 is a unique identifier that identifies the certificated bank to which the certificate is being issued within the electronic billing system administered by the certification authority identified by certification authority affiliation 315. In one embodiment, bank ID 300 consists of a combination of a bank's name, location, Federal Reserve Bank routing number, and/or American Bank Association ("ABA") number. Bank public key 305 is the public key of the bank. Certification authority affiliation 315 indicates the particular certification authority that has issued the bank certificate. Certification authority digital signature 310 is a digital signature of the certification authority that authenticates the certificate as a valid certificate issued by the certification authority identified by certification authority affiliation 315. Certification authority digital signature 310 may be viewed as a seal that authenticates bankID 300 and bank public key 305 that ensures that they are delivered intact and unchanged to a recipient. Certification authority digital signature 310 may, for example, be generated by creating a message digest of bank ID 300 and bank public key 305 and encrypting the message digest using the certification authority's private key.

Figure 4:
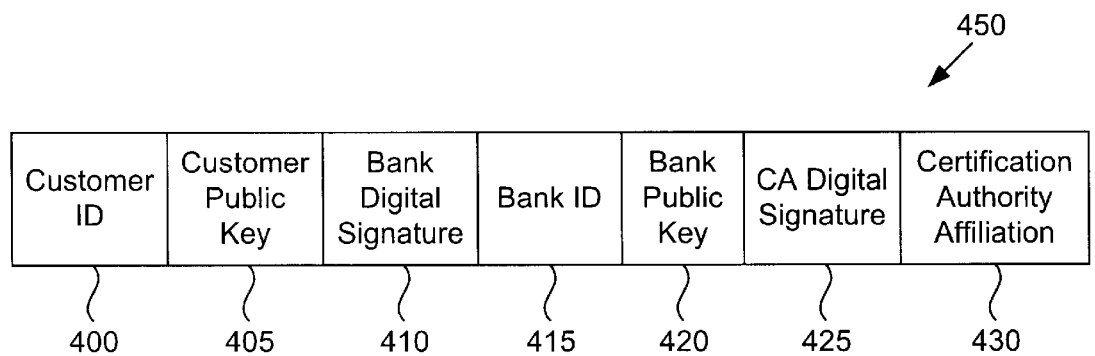
FIG. 4 is a schematic diagram of a customer certificate of one embodiment of the present invention.

FIG. 4 illustrates the digital data contained in a customer certificate issued by a certificated bank in one embodiment of the present invention. As shown in FIG. 4, customer certificate 450 contains a copy of bank certificate 350 in the form of bank ID 415, bank public key 420, certification authority digital signature 425, and certification authority affiliation 430, which are copies of bank ID 300, bank public key 305, certification authority digital signature 310, and certification authority affiliation 315 respectively. In addition, customer certificate 450 includes a customer ID 400, a customer public key 405, and a bank digital signature 410.

Customer ID 400 is a unique identifier with respect to the issuing certificated bank that uniquely identifies the customer to whom customer certificate 450 is issued from among the entities to which the certificated bank identified by bank ID 415 has issued certificates. Customer ID 400 in combination with bank ID 415 uniquely identifies the customer to whom certificate 450 has been issued from among all participants of the electronic billing system administered by the certification authority identified by certification authority affiliation 430.

Customer public key 405 is the public key of the customer. Bank digital signature 410 is a digital signature of the certificated bank that authenticates customer ID 400 and customer public key 405 and ensures that they are delivered intact and unchanged to a recipient. Certificated bank digital signature 410 may, for example, be generated by creating a message digest of customer ID 400 and customer public key 405 and encrypting the message digest using the certificated bank's private key.

Figure 5:
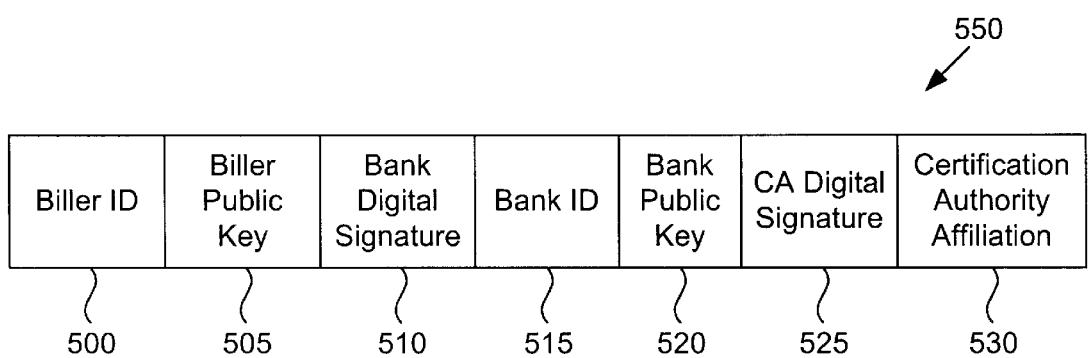
FIG. 5 is a schematic diagram of a biller certificate of one embodiment of the present invention.

FIG. 5 illustrates the digital data contained in a biller certificate issued by a certificated bank in one embodiment of the present invention. As shown in FIG. 5, biller certificate 550 is similar to customer certificate 450 of FIG. 4, except that the customer ID 400 and customer public key 405 are replaced with biller ID 500 and biller public key 505, respectively. Biller ID 500, like customer ID 400, is a unique identifier with respect to the issuing certificated bank that uniquely identifies the biller to whom biller certificate 550 is issued from among the entities to which the certificated bank identified by bank ID 515 has issued certificates. Biller ID 500 in combination with bank ID 515 uniquely identifies the biller to whom certificate 550 has been issued from among all participants of the electronic billing system administered by the certification authority identified by certification authority affiliation 530.

Figure 6:
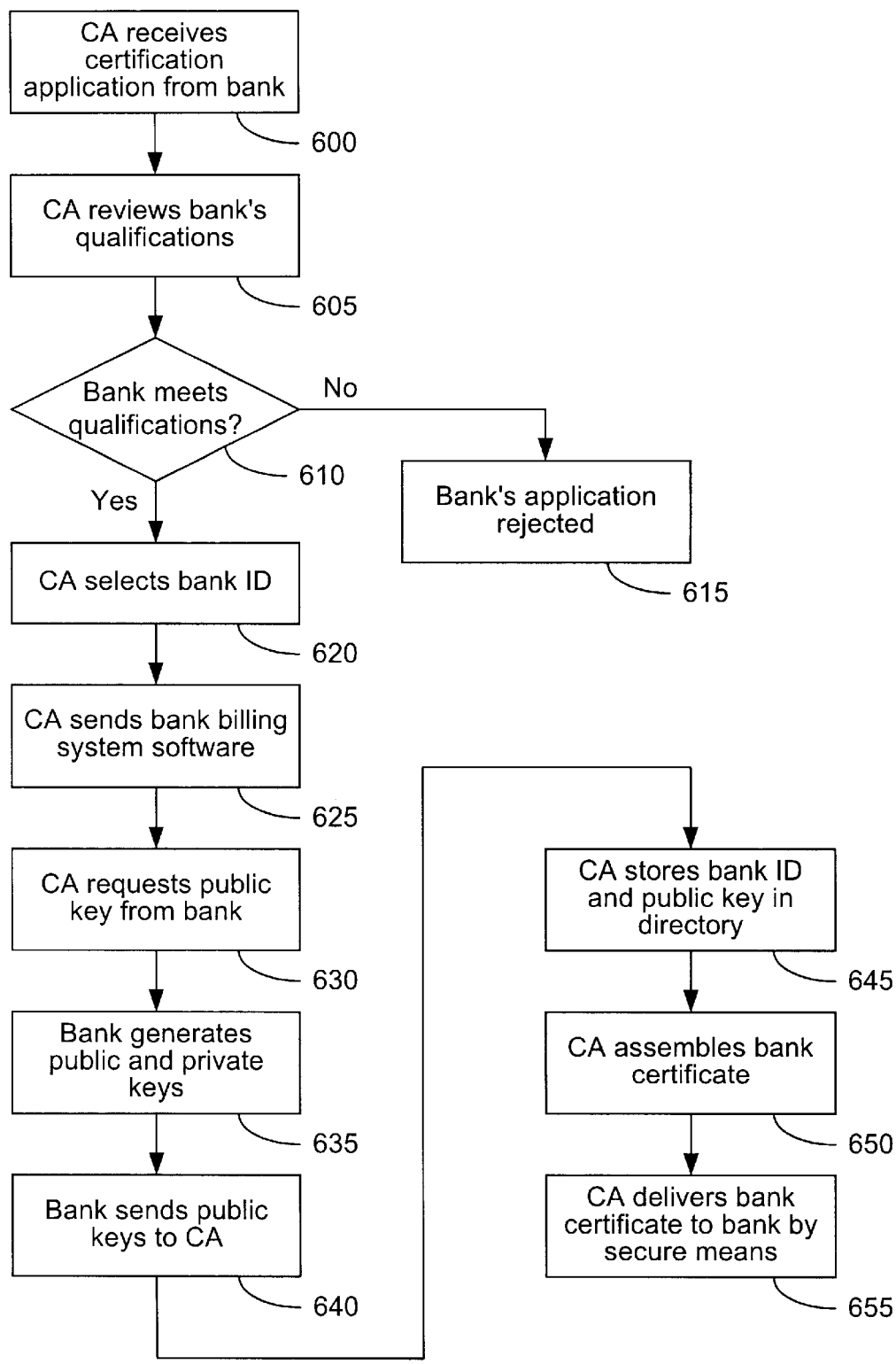
FIG. 6 is a block diagram illustrating a process by which a certification authority issues a bank certificate in one embodiment of the present invention.

FIG. 6 illustrates the process by which a certification authority issues a bank certificate to a bank in one embodiment of the present invention. The certification authority in general issues a bank certificate to a bank only if the bank meets financial and security qualifications established by the certification authority, and if the bank agrees to the terms and conditions associated with the electronic billing system.

As shown in FIG. 6, the process starts when a certification authority (CA) receives a certification application at block 600. A certification application may, for example, consist of a request for certification along with supporting documentation as required by the certification authority.

After receiving the certification application, the certification authority reviews the application and the applicant bank's qualifications at block 605. If the applicant bank fails to meet the certification authority's required qualifications at block 610, the bank's application is rejected at block 615. If the bank meets the certification authority's qualifications at block 610, the certification authority selects an ID for the bank at block 620. The certification authority sends billing system software to the bank (if needed) at block 625, and requests the bank's public key from the bank at block 630. The bank generates its public and private key pair using the billing system software (or some other appropriate method) at 635, and sends its public key to the certification authority at block 640. Alternatively, the bank's public and private keys may be generated by the certification authority, as part of the application process or after approval of the application. In this case, the private key must be delivered to the bank in a secure manner.

The certification authority stores the bank ID and the bank's public key in a directory at block 645, and assembles the bank's certificate at block 650. Finally, the certification authority delivers the bank's certificate to the bank by secure means at block 655.

One secure means that may be used for conveying the bank certificate from the certification authority to the bank is to encrypt a digitally signed bank certificate with the bank's public key, or with a session key encrypted with the bank's public key, and transmit it to the bank. In an embodiment in which the certification authority generates the bank's private key, the certification authority must also deliver the bank's private key to the bank. A second secure means that may be used is storing the certificate on a physical storage medium such as an integrated chip card and physically conveying the chip card to the bank.

Figure 7:
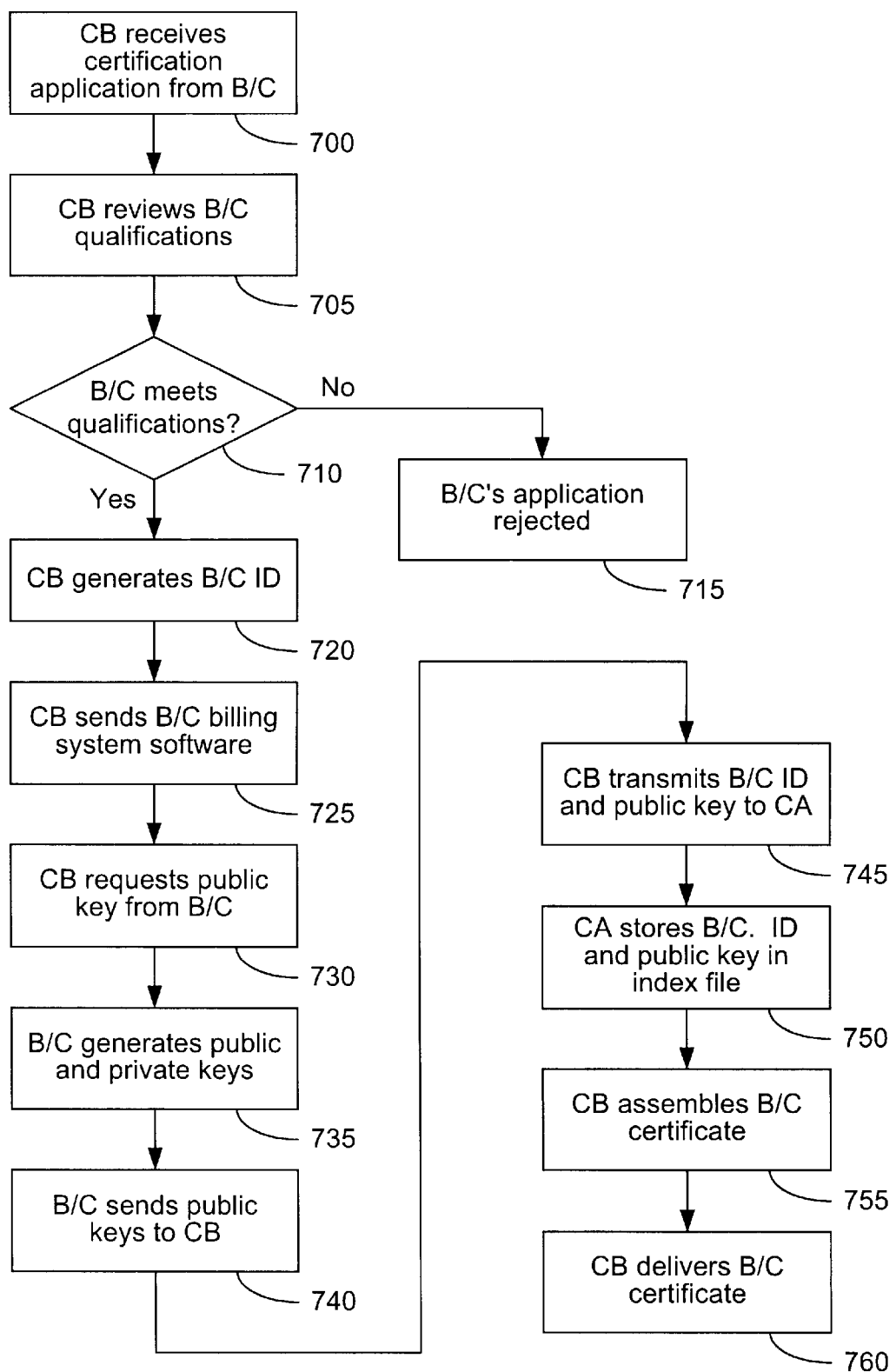
FIG. 7 is a block diagram illustrating a process by which a certificated bank issues a customer or biller certificate in one embodiment of the present invention.

FIG. 7 illustrates the process by which a certificated bank (a bank that has been certified by a certification authority) issues a biller certificate or a customer certificate to a biller or customer, respectively, in one embodiment of the present invention. The certificated bank in general issues a biller or customer certificate only if the biller or customer meets financial and/or other qualifications established by the certificated bank and/or the certification authority.

As shown in FIG. 7, the process starts when a certificated bank (CB) receives a certification application from a biller or customer (B/C) at block 700. A certification application may, for example, consist of a request for a B/C certificate along with supporting documentation as required by the certificated bank.

After receiving the certification application, the certificated bank reviews the application and the B/C's qualifications at block 705. If the applicant fails to meet the certification authority's required qualifications at block 710, the B/C's application is rejected at block 715. If the B/C meets the certificated bank's qualifications at block 710, the certificated bank generates an ID for the B/C at block 720. In one embodiment, the ID consists of a combination of B/C information (name, address, etc.) and a certificated-bank-generated number, for example an account number. The certificated bank sends billing system software to the B/C (if needed) at block 725. The certificated bank requests the B/C's public key from the B/C at block 730. The B/C generates its public and private key pair using the billing system software (or some other appropriate method) at 735, and sends its public key to the certificated bank at block 740. Alternatively, the B/C's public and private keys may be generated by the certificated bank, as part of the application process or after approval of the application. In this case, the private key must be delivered to the B/C in a secure manner.

The certificated bank sends the B/C ID and public key to the certification authority at block 745. The certification authority stores the B/C ID and the B/C's public key in a directory at block 750. Alternatively, or in addition, the certificated bank may store the B/C ID and public key in its own directory. The certificated bank assembles the B/C certificate at block 755. Finally, the certificated bank delivers the B/C's certificate to the B/C at block 760.

Figure 7A:
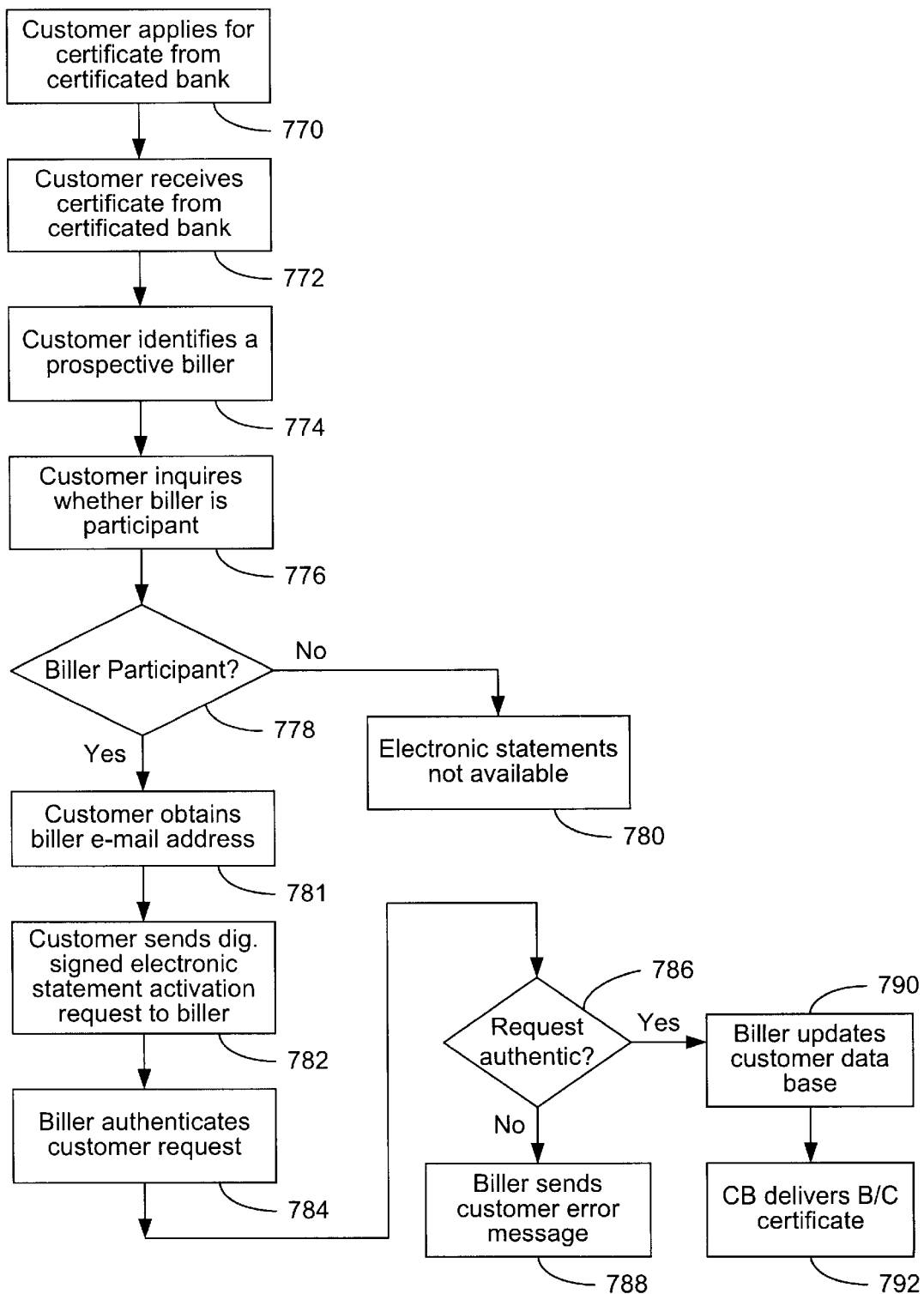
FIG. 7A is a block diagram illustrating a process by which a customer registers with a biller to receive electronic bills in one embodiment of the present invention.

FIG. 7A is a block diagram illustrating a process by which a customer registers with a biller to receive electronic bills in one embodiment of the present invention. As shown in FIG. 7A, the process starts when a customer becomes a participant in an electronic billing system by applying for and receiving a certificate from a certificated bank at blocks 770 and 772, respectively. Once the customer receives the customer's certificate, the customer is able to request electronic bill presentation services from a biller or other statement issuer. The customer identifies a statement issuer from whom the customer wishes to receive electronic statements at block 774, and inquires as to whether the statement issuer has been issued a biller certificate, and is therefore a participant in the electronic billing system, at block 776. The customer may undertake such an inquiry in a variety of ways. For example, the customer may contact the biller directly, by telephone or other means, or the customer may request information as to whether a biller is a participant from the customer's certificated bank or the certification authority. Alternatively, a biller may inform its customers, by letter or otherwise, of the biller's participation in an electronic payment system, or the biller may indicate the biller's participation in an electronic billing system on paper bills sent to its customers. In one embodiment, a certification authority authorizes a participant biller to use a logo or other identifier owned by the certification authority to indicate the biller's participation in an electronic billing system in a manner analogous to the way in which payment card systems (such as Visa, MasterCard, etc.) authorize merchants to display system logos to communicate that they accept payment cards issued by those systems.

If the customer learns that the prospective biller is not a participant at block 778, electronic statement delivery is not available, and the process ends at block 780. The customer is unable to receive electronic statements from this particular biller until such time as the biller becomes a participant in the electronic billing system by applying for and receiving a biller certificate.

Figure 7B:
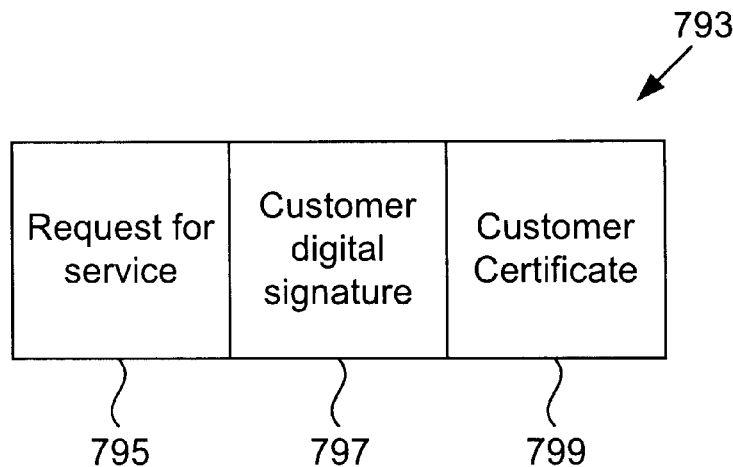
FIG. 7B is a schematic diagram of a customer request for electronic billing service to a biller of one embodiment of the present invention.

If the customer learns that the prospective biller is a participant in the electronic billing system, the customer obtains the biller's e-mail address (for example from the biller or the certificated bank or certification authority) at block 781 and sends a digitally signed request message for electronic billing to the biller at block 782. One embodiment of such a request message is shown in FIG. 7B. In this embodiment, the request message 793 includes the request for service 795 (which may include, for example, customer information such as the customer's name and address and the customer's account number with the biller), the customer's digital signature 797 (consisting of a message digest of the request 795 encrypted with the customer's private key), and a copy of the customer's certificate 799.

The biller authenticates the customer's request at block 784. In one embodiment, the biller authenticates the request by first authenticating the customer's certificate to verify that the customer has been validly certified by a validly certified certificated bank and to obtain the customer's public key. The biller then uses the customer's public key to decrypt the customer's digital signature, obtaining a message digest of the request itself, and compares the message digest from the customer's decrypted digital signature to a message digest of the request as received by the biller. If the two message digests are identical, the request is an authentic message from the customer identified in the customer certificate. In one embodiment, the biller also compares customer information included in the request to its customer records to verify that the customer is a customer of biller and is authorized to request changes in service. This authentication process is analogous to the process that is used by a biller receiving a change in address notification from a customer to verify that the change in address request is authentic.

If the biller finds that the request is not authentic at block 786, for example because the certificate is not valid, or because the message digest contained in the customer's decrypted digital signature is not identical to a message digest of the appended request, or if customer information included in the request does not match biller account records, then the biller sends an error message to that effect at block 788. If the request is authentic, the biller updates the biller's customer data base to add the-customer's e-mail address and public key and to reflect that the customer has requested initiation of electronic billing at block 790. The biller begins its electronic billing service to the customer at block 792.

Figure 8A:
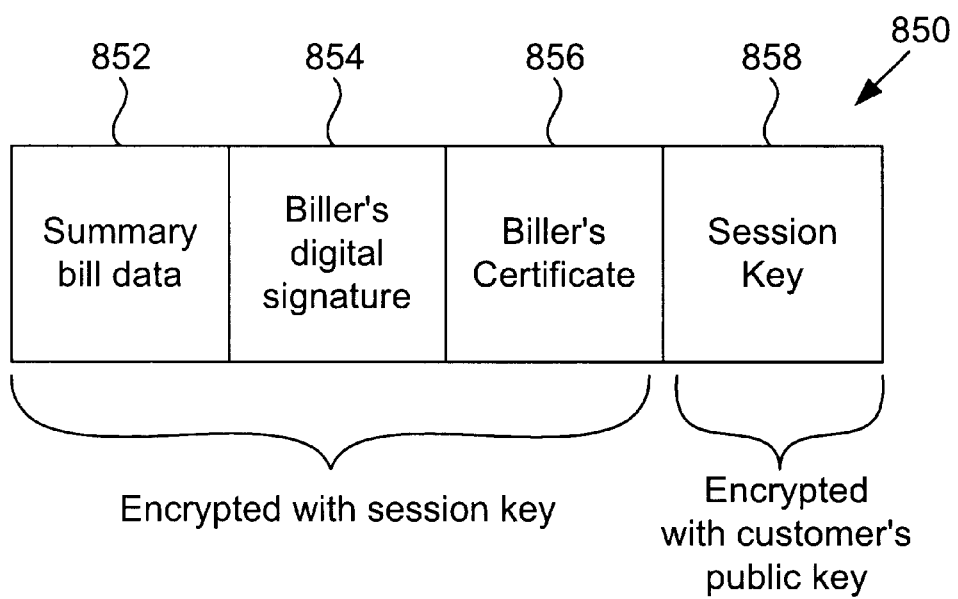
FIG. 8A is a schematic diagram of one embodiment of a biller's e-mail message containing summary bill data.
Figure 8:
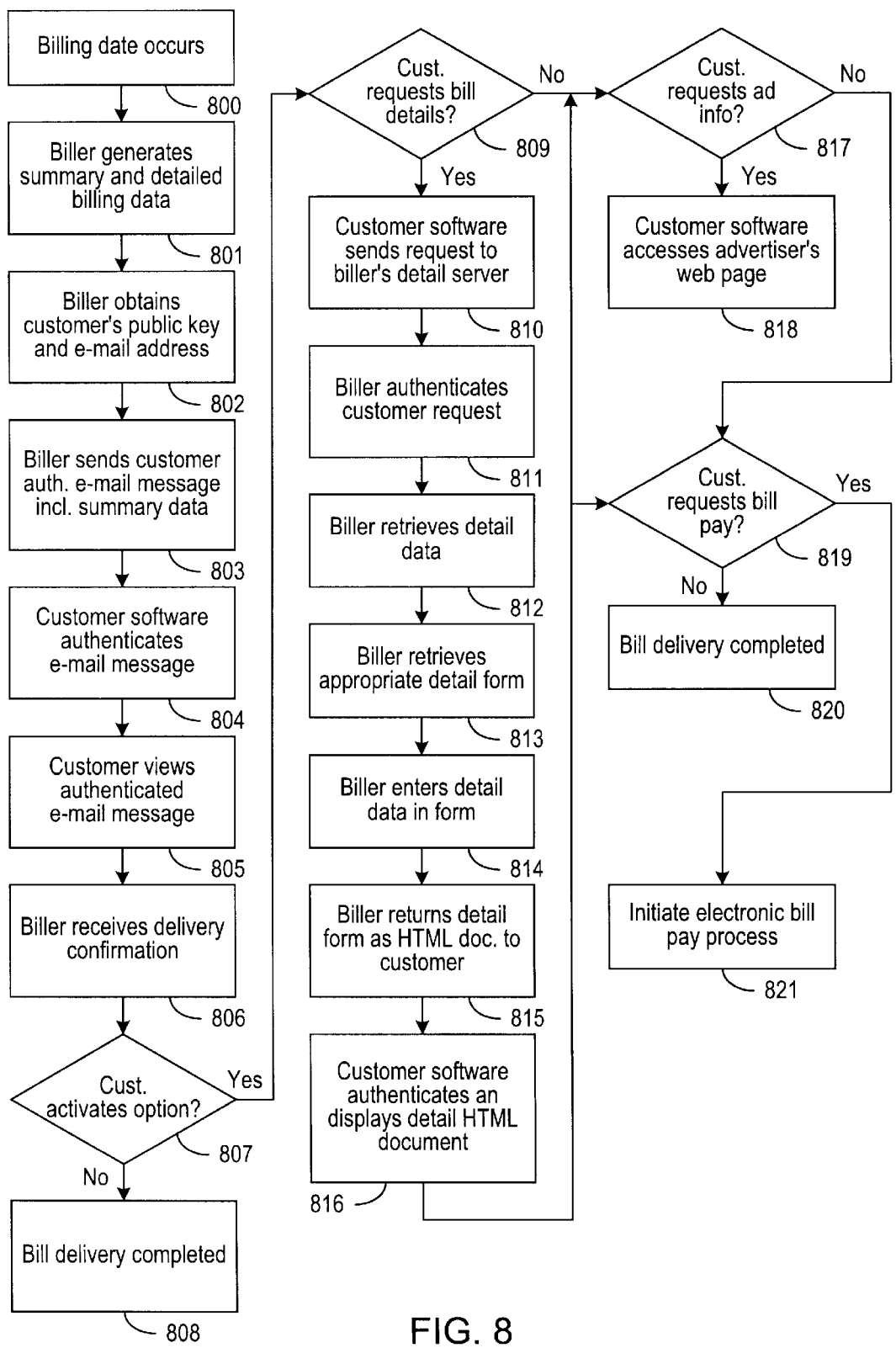
FIG. 8 is a block diagram illustrating the process by which a biller sends a bill to a customer in one embodiment of the present invention.

FIG. 8 is a block diagram illustrating the process by which a biller sends a bill or other account statement to a customer in one embodiment of the present invention. As shown in FIG. 8, the process starts when the billing date occurs at block 800. The biller generates summary and detailed bill data at block 801. The biller obtains the customer's e-mail address and public key at block 802. The biller may obtain the customer's e-mail address and public key from a locally stored data file, if available (for example if the biller has previously obtained the customer's e-mail address and public key), or from the data base maintained by the certification authority or certificated bank, or by some other appropriate means. The biller sends the customer an authenticated e-mail message at block 803. Software at the customer's computer authenticates the e-mail message at block 804.

In one embodiment, the body of the e-mail message contains the summary bill data, as well as links for accessing detailed billing data, for obtaining advertising materials, and for initiating electronic payment of the bill. The biller appends the biller's digital certificate, digitally signs the body of the e-mail message, and encrypts the entire e-mail message, including the digital signature, using the customer's public key (or using a session key encrypted with the customer's public key). The biller then sends the encrypted message (and encrypted session key, if applicable) to the customer.

FIG. 8A is a schematic diagram of one embodiment of a biller's e-mail message containing summary bill data. As shown in FIG. 8A, in this embodiment, the e-mail message 850 includes summary bill data 852, the biller's digital signature 854, the biller's certificate 856, and a session key 858. The biller's digital signature 854 consists of a message digest of the summary bill data 852 encrypted with the biller's private key. In this embodiment, summary bill data 852, biller's digital signature 854, and biller's certificate 856 are all encrypted using session key 858. Session key 858 in turn is encrypted using the customer's public key.

The customer's software decrypts the message using the customer's private key (and decrypted session key, if applicable), and verifies the digital signatures of the certification authority and the certificated bank contained in the biller's certificate. Finally, the customer's software verifies the biller's digital signature, and displays the authenticated message to the customer. In one embodiment, the customer's software stores a copy of the biller's digital certificate, or a record that the biller's public key has been validated, in a local storage media such as the customer computer's hard disk drive. By doing so, for subsequent bills from the same biller, the only computation required is verification of the biller's digital signature.

The customer views the authenticated e-mail message at block 805. In this embodiment, the viewing of the e-mail message by the customer (or, more precisely, the display of the e-mail message) triggers the sending of a return e-mail message to the biller confirming that the bill has been delivered to the customer. The biller receives this confirmation at block 806.

In this embodiment, the summary bill contains links that can optionally be activated by the customer. These links include a link to a detailed bill, a link to an advertiser, and a link to an electronic bill pay system.

If the customer does not activate any of the options, bill delivery is completed at block 808. The customer may print out the bill, or leave it stored on the computer. The customer may pay the bill by mail or by electronic means.

If the customer activates the bill detail option at block 809, the customer's software sends a request to the biller for detailed information. The link to the detailed bill information contained in the e-mail message contains the appropriate network address to which the request should be transmitted. The request contains a unique bill identification number obtained from the summary bill. The customer's software may append the customer's digital certificate to the body of the message. The customer's software digitally signs the message, optionally encrypts the message, if additional security is needed, using the biller's public key (or a session key generated by the customer's software and encrypted with the biller's public key), and transmits the message to the address for the appropriate biller detail server specified in the link at block 810.

The biller's software decrypts, if necessary, and authenticates the received customer request for detailed data at block 811, and retrieves the detail data at block 812. The biller retrieves the appropriate detail form at block 813. The particular form selected will conform to the legal requirements for the particular jurisdiction in which the customer is located. The biller enters the detail data into the appropriate form at block 814, and returns the form, complete with data, to the customer at block 815. In this embodiment the detail bill constitutes an HTML document. In one embodiment, the entire HTML document is encrypted and sent with the same security provisions as those used in sending the summary data bill. In an alternate embodiment, only selected data in the HTML document (for example data which by agreement between the customer and the biller, by law, or for some other reason must be kept confidential) is encrypted. In an embodiment in which the summary data bill is encrypted with a session key, the same session key may be used to encrypt the detail bill. Finally, the customer's software authenticates and decrypts the detail bill and displays it to the customer at block 816.

The detail bill, like the summary bill, may contain links to advertising materials and/or to an electronic bill payment process or system.

If the customer activates the link for requesting advertising information at block 817, either from the summary bill or from the detailed bill, the customer's software connects to the advertiser's web page using the address contained in the advertising information link at block 818.

If the customer activates the link for paying the bill electronically at block 819, either from the summary bill or from the detailed bill, the customer's software initiates an electronic bill pay process at block 821. This electronic pay process may utilize the SET protocols, or may be any other appropriate electronic bill pay process. The process may, but need not, be provided by the customer's certificated bank.

If the customer neither selects the advertising information or the bill payment options at blocks 817 and 819, respectively, bill delivery is, completed at block 820.

Figure 9:
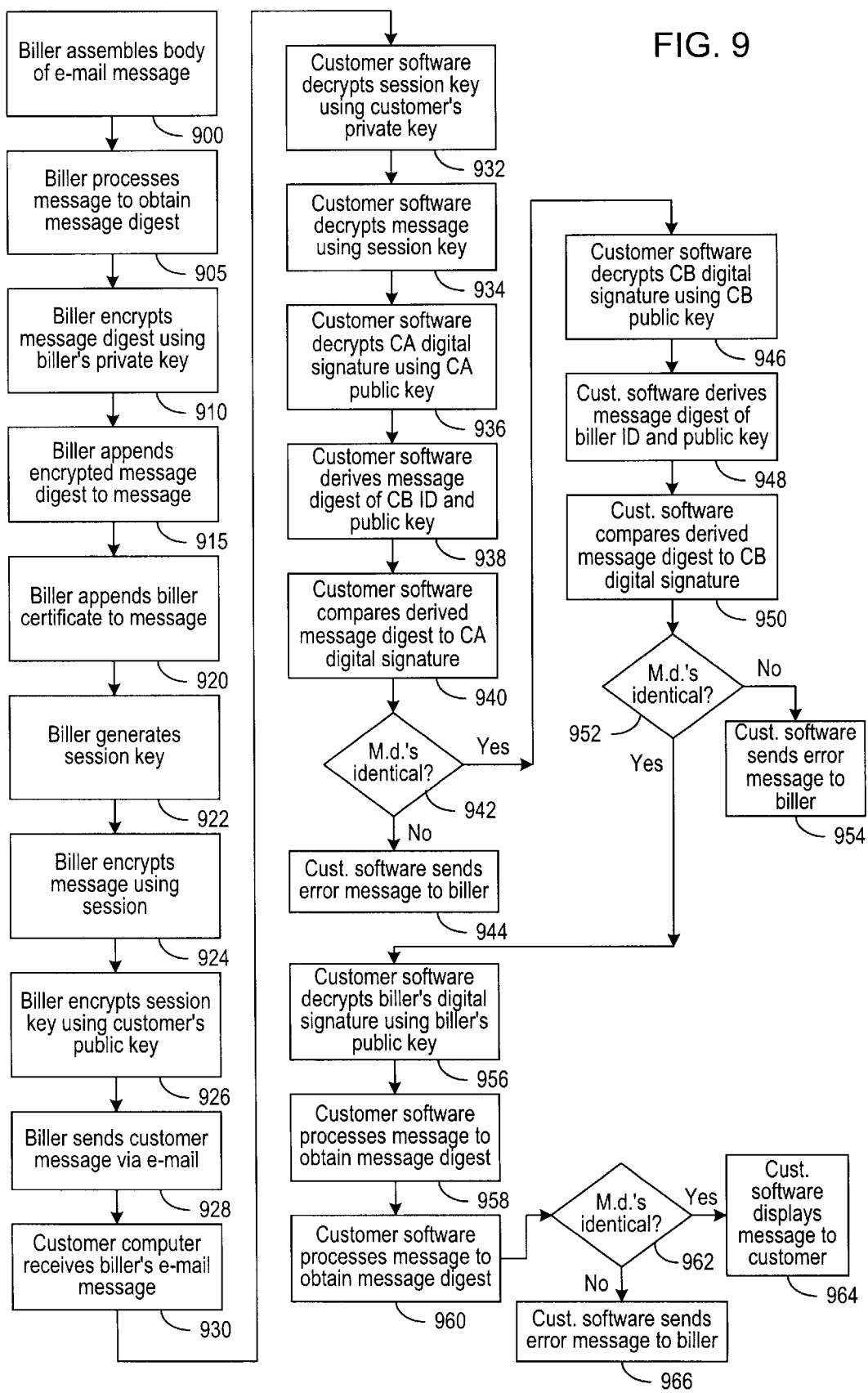
FIG. 9 is a block diagram of a method used by a customer's software to authenticate an incoming biller message in one embodiment of the present invention.

The process by which a biller's message is authenticated by the customer's software in one embodiment of the present invention is illustrated in FIG. 9. The same general process, substituting the customer for the biller and the biller for the customer, as appropriate, may be used by a biller to authenticate a customer message.

As shown in FIG. 9, the biller, or more precisely the biller's software, assembles the body of the e-mail message at block 900, and processes the message using a digesting program to obtain a message digest at block 905. The biller's software encrypts the message digest using the biller's private key at block 910 and appends the encrypted message digest to the message at block 915. The encrypting of the message digest using the biller's private key and appending the encrypted message digest to the message constitutes digitally signing the message with the biller's signature. The digital signature allows the customer to verify that the biller is the originator of the message and that the message has not been changed en route to the customer.

The biller's software appends the biller's digital certificate to the digitally signed message at block 920. In this embodiment, the biller's certificate, as in the embodiment of FIG. 5, includes a certification authority's digital signature verifying the certification of the certificated biller bank, and the certificated bank's digital signature verifying the certification of the biller and the authenticity of the biller's public key. In this embodiment, the certification authority's digital signature consists of a message digest of the certificated biller bank's ID number and public key encrypted, using the certification authority's private key. Similarly, the biller-bank's digital signature-consists of the biller's ID number and public key encrypted using the biller bank's private key.

After appending the biller certificate to the message, the biller's software generates a session key at block 922, and encrypts the biller's message (including the appended digital signature and certificate) using the session key at block 924. The biller's software then encrypts the session key using the customer's public key at block 926.

The biller's software sends the encrypted message and encrypted session key to the customer via e-mail at block 928. The customer receives the biller's e-mail package at block 930. The customer's software decrypts the session key using the customer's private key at block 932, and uses the decrypted session key to decrypt the remainder of the-mail message at block 934.

The customer's software verifies the message by sequentially verifying the hierarchy of digital signatures included in the biller's digital certificate. The customer's software first retrieves the certification authority's identity from the certification authority affiliation field of the biller's certificate. Using the public key of the certification authority so identified (which the certification authority makes widely available), the customer's software verifies the certification authority's digital signature to determine whether the public key and bank ID for the certificated bank included in the biller's certificate are genuine. The customer's software decrypts the certification authority's digital signature at block 936, obtaining a message digest of the biller bank's ID number and public key. The customer's software derives a message digest of the biller bank's ID number and public key as specified in the biller certificate at block, 938, and compares the derived message digest to the message digest from the decrypted certification authority's digital signature at block 940. If the message digests are found to be not identical at block 942, the customer's software sends an error message to the biller at block 944.

If the message digests are found to be identical at block 942, then the certificated bank's ID and public key included in the biller's digital certificate are authentic The customer's software uses the biller bank's authenticated public key to decrypt the certificated biller bank's digital signature at block 946, obtaining a message digest of the biller's ID number and public key. The customer software derives a message digest of the biller's ID and public key as specified in the biller's certificate at block 948, and compares the two message digests at block 950. If the two digests are found to be not identical at block 952, the customer software sends an error message to the biller at block 954.

If the message digests are found to be identical at block 952, then the biller's ID and public key included in the biller's digital certificate are authentic. The customer's software uses the authenticated public key of the biller to decrypt the biller's digital signature at block 956, obtaining a message digest of the included message. The customer software derives a message digest of the message at block 958, and compares the two message digests at block 960. If the two digests are found to be not identical at block 962, the customer software sends an error message to the biller at block 966.

If the message digests are found to be identical at block 962, then the included message is authentic, and the customer software displays the message to the customer at block 964.

In one embodiment of the invention, a certificate issued by a certificated bank to a customer may be used by the customer to make electronic payments as well as to receive electronic statements, and a certificate issued by a certificated bank to a biller may be used by the biller to receive electronic payments as well as to present bills electronically. In one embodiment, a customer or biller applying for a certificate from a certificated bank may request that an electronic payment account be established that is linked to the certificate. In one embodiment, such an account functions much like a credit card account or a checking account with debit card access. The customer sends a biller an authorization to receive payment from the customer's payment account, the biller conveys the authorization to the customer's certificated bank, and the customer's certificated bank electronically transmits the authorized amount to the biller's certificated bank for payment into the biller's electronic payment account In another embodiment, the customer may use the customer's certificate to make electronic payments using an existing payment card. In one embodiment, the customer sends a payment authorization to the biller in which the customer specifies the amount being paid and the credit card (or other payment card) account number to be charged. The customer's software digitally signs the payment authorization by encrypting a message digest of the payment authorization with the customer's private key. The customer's software appends the customer's certificate to the digitally signed payment authorization and encrypts the customer's payment authorization, digital signature, and certificate using a session key. The customer's software encrypts the session key using the biller's public key, appends the encrypted session key to the rest of the message, and sends the resulting message via e-mail to the biller. The biller decrypts the session key using the biller's private key and uses the session key to decrypt the customer's certificate, digital signature and payment authorization. The biller verifies the authenticity of the customer's certificate, and verifies that the message digest obtained by decrypting the customer's digital signature using the customer's public key matches a message digest of the customer's payment authorization. The biller subnits the payment authorization to the appropriate payment card authority, and the biller's account is credited with the payment amount In one embodiment, the biller retains a copy of the customer's payment authorization and digital signature for accountability and to prevent repudiation of the payment authorization by the customer.

Figure 10:
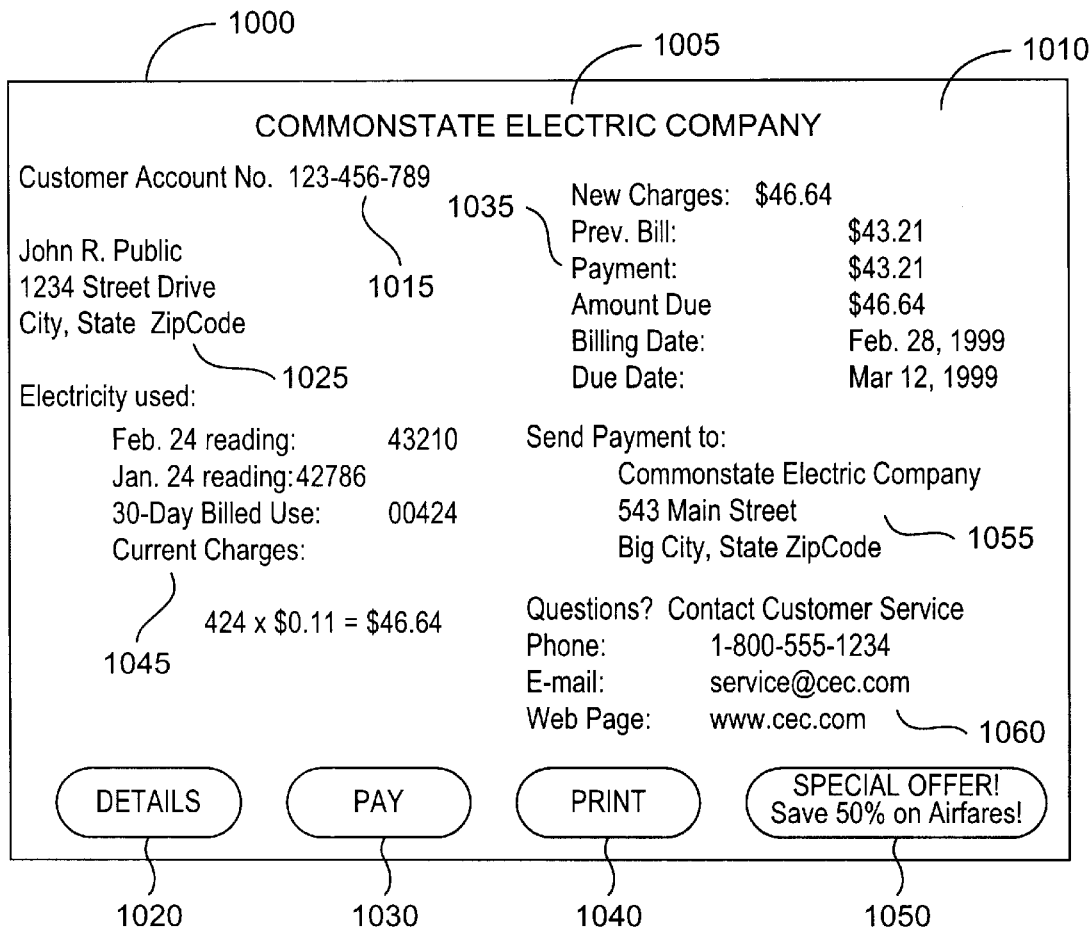
FIG. 10 is an illustration of an interactive bill of one embodiment of the present invention containing summary data.

FIG. 10 is an illustration of an embodiment of a summary bill that may be sent by a biller in one embodiment of the present invention. FIG. 10 shows the bill as displayed by the customer's software on the customer's computer or other display device. This embodiment is shown as an example only. A wide variety of other formats for a summary bill may be used.

As shown in FIG. 10, summary bill 1000 consists of a summary bill information area 1010 and four action buttons 1020, 1030, 1040 and 1050, respectively. Summary bill information area 1010 contains summary bill data. In this example, the biller is an electric utility company. The summary bill data includes the biller's name 1005, the customer's account number with the biller 1015, the customer's name and address 1025, a listing of current and previous charges 1035, an explanation of current charges 1045, a return address for the biller 1055, and customer service information 1060. Customer service information 1060 includes the biller's customer service telephone number, e-mail address and URL that can be used by the customer to contact the biller if there are any questions. The summary information contained in the summary bill information area 1010 corresponds generally to the information that would be contained on the remittance stub of a mailed, paper bill.

Action buttons 1020, 1030, 1040 and 1050 allow the customer to obtain additional information or perform certain functions. Action button 1020 is a "Details" button. By activating action button 1020, for example by clicking on it with a mouse, the customer's software at the customer's computer sends a request for bill details to the biller. Action button 1030 is a "Pay" button. Action button 1030 is displayed if the customer has access to an electronic bill payment system. In one embodiment, activating button 1030 initiates a link to electronic bill payment system software that allows the customer to initiate payment of the bill utilizing an electronic bill payment system such as, for example, the electronic bill pay system described in U.S. Pat. No. 5,465,206. In another embodiment of the invention, the customer's software includes the capability of transmitting an electronic payment directly to the biller, for example in the form of an encrypted and digitally signed payment card payment authorization. Action button 1040 is a "Print" action button. By activating button 1040, a hard copy of the displayed summary bill is printed on the customer's printer. Action button 1050 is a "Special Offer" action button. In the embodiment of FIG. 1050, action button 1050 contains a short "teaser" about the special offer in the form of the words "Save 50% on Airfares!" By activating button 1050, the customer's software retrieves a web page linked to button 1050, and displays the web page to the customer. The web page may be a web page of a third party advertiser containing an advertisement from the third party as in the embodiment shown in FIG. 10, or may be a web page of the biller, containing details of a special offer available from the biller.

Figure 11:
FIG. 11 is an illustration of an interactive bill of one embodiment of the present invention containing detailed data.

FIG. 11 illustrates an example of a detailed bill of one embodiment of the present invention that is sent by the biller to the customer in response to the customer activating "Details" action button 1020 of summary bill 1000 of FIG. 10. The detailed bill may be an HTML document. As shown in FIG. 11, detailed bill 1100, like summary bill 1000, includes the biller's name 1005, the customer's account number 1015, the customer's name and address 1025, a listing of current and previous charges 1035, an explanation of current charges 1045, return address 1055, and customer service information 1060. In the embodiment of FIG. 11, customer service information 1060 includes a customer service link button 1150 that links directly to the biller's customer service web page. Detailed bill 1100 also includes "Pay" action button 1030 and "Print" action button 1040. In addition, detailed bill 1100 includes an additional detail field 1110, advertising fields 1130 and 1140, and public service message field 1120.

In the embodiment of FIG. 11, additional detail field 1110 contains a graph showing the customer's usage history. In other embodiments, additional detail field 1110 may contain other billing information that would be included in the detailed portion of a mailed, paper bill. For example, if the bill is a telephone bill, detail data field 1110 may include a listing of all toll calls made by the customer during the billing period. Additional detail field 1110 may contain additional sub-fields, be of any desired size, and may encompass several pages.

Advertising fields 1130 and 1140 contain advertisements. These advertisements may be advertisements for products and services of the biller or may be for products and services for third party advertisers. The particular advertisements displayed on a customer's bill may be selected based on criteria such as the customer's profile, the particular time and date at which the customer requests the detailed bill, the geographic location of the customer, the customer's usage history, etc. Advertisements may therefore be highly focused. For example, special offers may be removed when time limits or limits on the number of respondents have been exceeded. Messages concerning water conservation may be directed by a utility to high water users. On a very hot day, an electric company may display an advertisement for energy saving air conditioners that appears to come from the utility but links to the web page of an appliance store in the customer's vicinity.

In the embodiment of FIG. 11, advertising field 1130 contains an advertisement for automotive services while field 1140 contains an advertisement for a travel organization. To access details of the advertisements, advertising fields 1130 and 1140 include action buttons 1135 and 1145, respectively. Selecting either of these action buttons will bring up the web page containing additional information about the advertised items. Advertising fields 1130 and 1140 as a whole may also constitute link activation areas.

Public message field 1120 is used to display messages intended to be helpful to the customer, and may contain public service messages, hints on conserving energy and resources, or any other messages. In the embodiment of FIG. 11, public message field 1120 is itself an action button. Accordingly, clicking anywhere on message field 1120 will bring up the corresponding web page.

Figure 12:
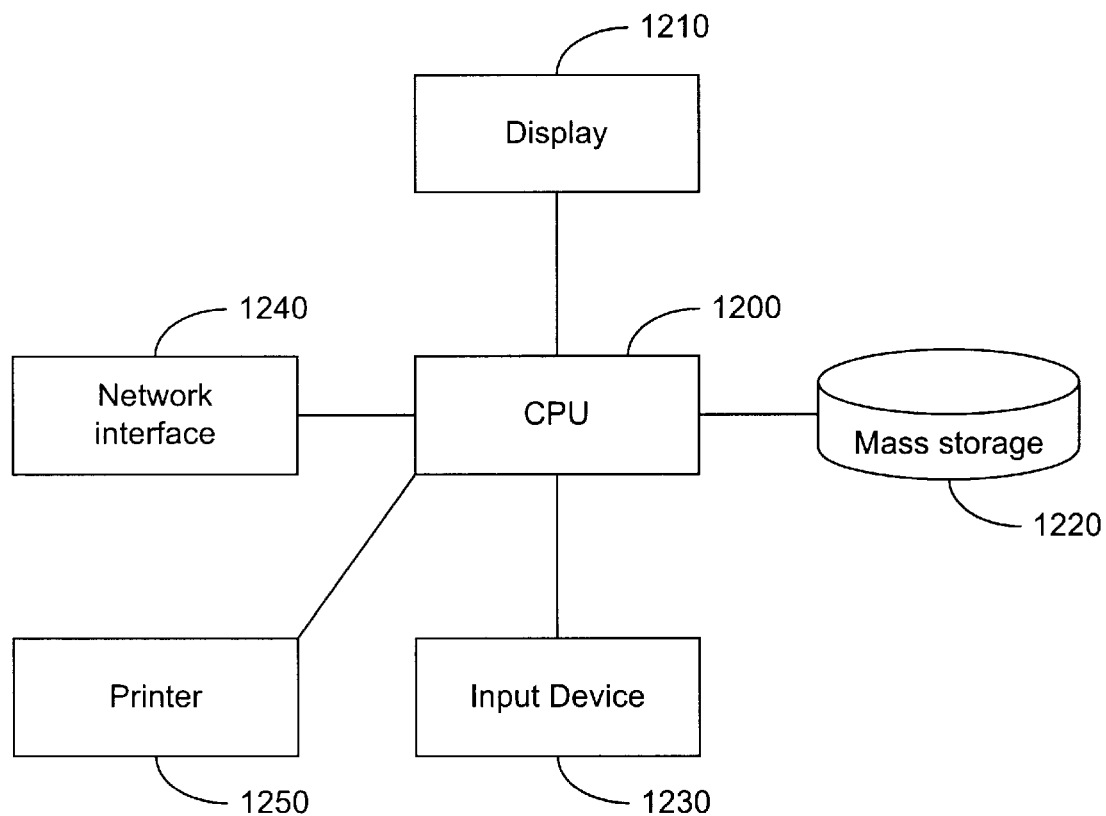
FIG. 12 is a schematic diagram of an example computer system that can be used for a customer, biller, bank, or certification authority computer system of the present invention.

The present invention can be implemented by means of software programming on any of a variety of one or more computer systems as are well known in the art, including, without limitation, computer systems such as that shown in FIG. 12. The computer system of FIG. 12 may, for example, be used as a customer computer, a biller computer, a bank computer, or a certification authority computer. The computer system shown in FIG. 12 includes a CPU unit 1200 that includes a central processor, main memory, peripheral interfaces, input-output devices, power supply, and associated circuitry and devices; a display device 1210 which may be a cathode ray tube display, LCD display, gas-plasma display, or any other computer display; an input device 1230, which may include a keyboard, mouse, digitizer, or other input device. The computer system may or may not include non-volatile storage 1220, which may include magnetic, optical, or other mass storage devices, and a printer 1250. The computer system may also include a network interface 1240, which may consist of a modem, allowing the computer system to communicate with other systems over a communications network such as the Internet. Any of a variety of other configurations of computer systems may also be used.

Thus a novel secure interactive electronic account statement delivery system has been presented. Although the present invention has been described with respect to certain example embodiments, it will be apparent to those skilled in the art that the present invention is not limited to these specific embodiments. For example, although the statements that are electronically presented to a customer using the present invention have in certain instances been described as "bills" and the originators of the statements as "billers," it will be apparent to those skilled in the art that the invention may be used for presenting statements other than bills from entities other than billers. For example, the present information can be used by a bank, stock broker-or other financial services provider to deliver periodic account balance information to a customer. Further, although the operation of certain embodiments has been described in detail using certain detailed process steps, some of the steps may be omitted or other similar steps may be substituted without departing from the scope of the invention. Further, although the invention has been described as utilizing the Internet as a transport network, other networks or other communications media may be used.

What is claimed is:

1. A method for delivering account statement data from a statement issuer to a customer using a communications network comprising:

directing application information for a customer certificate transmitted from a customer to a certificated bank;

sending said customer certificate from said certificated bank to said customer;

informing said customer whether a statement issuer is a participant in an electronic billing system;

providing said customer with an e-mail address which belongs to said statement issuer;

receiving an electronic statement activation request, a customer digital signature, and a copy of said customer certificate transmitted from said customer to said statement issuer through use of the e-mail address;

authenticating, by said statement issuer, of said electronic statement activation request;

updating, by said statement issuer, a customer data base following successful authentication;

activating said electronic billing system between the statement issuer and the customer;

issuing a statement issuer certificate from a first certificate issuer to said statement issuer, said statement issuer certificate comprising a digital signature of said first certificate issuer;

issuing said customer certificate from one of said first certificate issuer or a second certificate issuer to a customer, said customer certificate comprising a digital signature of said first certificate issuer or said second certificate issuer;

generating a customer statement message comprising account statement data for said customer, a digital signature of said statement issuer, and a copy of said statement issuer certificate; and transmitting said customer statement message from said statement issuer to said customer using said communications network.

2. The method of claim 1 wherein the authenticating of said electronic statement activation request further comprises:

verifying an authenticity of said copy of said customer certificate included with said electronic statement activation request; and verifying an authenticity of said electronic statement activation request by verifying said customer digital signature.

3. A method for delivering account statement data from a statement issuer to a customer using a communications network comprising:

issuing a statement issuer certificate from a first certificate issuer to a statement issuer, said statement issuer certificate comprising a digital signature of said first certificate issuer;

issuing a customer certificate from one of said first certificate issuer or a second certificate issuer to a customer, said customer certificate comprising a digital signature of said first certificate issuer or said second certificate issuer;

generating a customer statement message comprising account statement data for said customer, a digital signature of said statement issuer, and a copy of said statement issuer certificate, transmitting said customer statement message from said statement issuer to said customer using said communications network;

receiving said customer statement message transmitted from said statement issuer to said customer;

verifying an authenticity of said copy of said statement issuer certificate included in said customer statement message;

verifying an authenticity of said account statement data by verifying said statement issuer digital signature included in said customer statement message;

displaying a summary bill which is contained within said customer statement message on a display screen, said customer statement message comprises link activation information displayed as a link activation area when said summary bill is displayed on said display screen, wherein activation of said link activation area activates a communication to a server computer using said communications network;

receiving a request for detailed bill information transmitted from said customer to said server computer;

authenticating said request for said detailed bill information at said server computer;

retrieving a set of detailed bill data;

retrieving an appropriate detailed bill form;

entering said set of detailed bill data into said appropriate detailed bill form; and thereafter sending said appropriate detailed bill form containing said detailed bill data to said customer.

4. The method of claim 3 further comprising:

receiving and authenticating said detailed bill form containing said detailed bill data transmitted from said customer; and displaying said detailed bill form containing said detailed bill data on said display screen.

5. The method of claims 1 or 3 wherein said statement issuer certificate comprises a first certificate issuer certificate.

6. The method of claim 5 wherein said first certificate issuer certificate comprises a digital signature of a certification authority.

7. The method of claims 1 or 3 wherein said first certificate issuer is a certificated bank.

8. The method of claims 1 or 3 wherein said second certificate issuer is a certificated bank.

9. The method of claims 1 or 3 wherein said statement issuer is a biller.

10. The method of claims 1 or 3 wherein said statement issuer certificate comprises data related to said statement issuer and wherein said digital signature of said first certificate issuer comprises an encrypted message digest of said data related to said statement issuer.

11. The method of claim 10 wherein said data related to said statement issuer comprises an identification number for said statement issuer.

12. The method of claim 11 wherein said data related to said statement issuer comprises a public key of said statement issuer.

13. The method of claim 10 wherein said encrypted message digest is encrypted using a private key of said first certificate issuer.

14. The method of claim 10 wherein said statement issuer certificate comprises a first certificate issuer certificate,
wherein said first certificate issuer certificate comprises a digital signature of a certification authority, and
wherein said first certificate issuer certificate comprises data related to said first certificate issuer and wherein said digital signature of said certification authority comprises an encrypted message digest of said data related to said first certificate issuer.

15. The method of claim 14 wherein said data related to said first certificate issuer comprises an identification number for said first certificate issuer.

16. The method of claim 15 wherein said data related to said first certificate issuer comprises a public key of said first certificate issuer.

17. The method of claims 1 or 3 wherein said customer certificate comprises data related to said customer and wherein said digital signature of said first certificate issuer or said second certificate issuer comprises an encrypted message digest of said data related to said customer.

18. The method of claim 17 wherein said data related to said customer comprises an id identification number for said customer.

19. The method of claim 18 wherein said data related to said customer comprises a public key of said customer.

20. The method of claim 17 wherein said encrypted message digest is encrypted using a private key of said first certificate issuer or said second certificate issuer.

21. The method of claim 1 further comprising:
receiving said customer statement message transmitted from said statement issuer to said customer;
verifying an authenticity of said copy of said statement issuer certificate included in said customer statement message; and
verifying an authenticity of said account statement data by verifying said statement issuer digital signature included in said customer statement message.

22. The method of claims 21 or 3 wherein said statement issuer certificate comprises data related to said statement issuer, and wherein said digital signature of said first certificate issuer comprises an encrypted first message digest of said data related to said statement issuer.

23. The method of claim 22 wherein said verifying an authenticity of said copy of said statement issuer certificate comprises:
decrypting said digital signature of said first certificate issuer using a public key of said first certificate issuer to obtain an unencrypted first message digest of said data related to said statement issuer;
deriving a second message digest of said data related to said statement issuer included in said copy of said statement issuer certificate included in said customer statement message received by said customer; and
comparing said first message digest and said second message digest.

24. The method of claims 21 or 3 wherein said digital signature of said statement issuer comprises an encrypted first message digest of said account statement data for said customer and wherein said verifying an authenticity of said account statement data is performed by verifying said statement issuer digital signature included in said customer statement message comprises:
deriving a second message digest of said account statement data for said customer included in said customer statement message; and
comparing said first message digest and said second message digest.

25. The method of claims 1 or 3 wherein said customer statement message comprises an electronic mail message.

26. The method of claim 21 further comprising displaying a summary bill which is contained within said customer statement message on a display screen.

27. The method of claims 26 or 3 further comprising sending a notification message to said statement issuer notifying said statement issuer that said customer statement message has been displayed.

28. The method of claim 26 wherein said customer statement message comprises link activation information displayed as a link activation area when said summary bill is displayed on said display screen.

29. The method of claim 28 wherein activation of said link activation area activates a communication to a server computer using said communications network.

30. The method of claims 29 or 3 wherein said server computer provides additional customer account statement data to said customer in response to said communication.

31. The method of claims 29 or 3 wherein said server computer provides advertising data to said customer in response to said communication.

32. The method of claim 31 wherein said advertising data provided by said server computer to said customer depends upon a time at which said communication is made.

33. The method of claim 31 wherein said advertising data provided by said server computer to said customer depends upon a geographic location of said customer.

34. The method of claim 31 wherein said advertising data provided by said server computer to said customer depends upon a parameter related to said customer.

35. The method of claim 27 wherein said customer account statement data comprises amount due data further comprising:
displaying an electronic payment activation area on said display screen.

36. The method of is claim 35 wherein activating said electronic payment activation area activates an electronic payment process that may be used by said customer to pay said amount due.

37. A program storage device readable by a machine, tangibly embodying a program of instructions executable by the machine to perform operations for delivering account statement data from a statement issuer to a customer using a communications network, said method comprising:
directing application information for a customer certificate transmitted from a customer to a certificated bank;
sending said customer certificate from said certificated bank to said customer;
informing said customer whether a statement issuer is a participant in an electronic billing system;
providing said customer with an e-mail address which belongs to said statement issuer;
receiving an electronic statement activation request, a customer digital signature, and a copy of said customer certificate transmitted from said customer to said statement issuer through use of the e-mail address;

authenticating, by said statement issuer, of said electronic statement activation request;

updating, by said statement issuer, a customer data base following successful authentication;

activating said electronic billing system between the statement issuer and the customer;

issuing a statement issuer certificate from a first certificate issuer to said statement issuer, said statement issuer certificate comprising a digital signature of said first certificate issuer;

issuing said customer certificate from one of said first certificate issuer or a second certificate issuer to a customer, said customer certificate comprising a digital signature of said first certificate issuer or said second certificate issuer;

generating a customer statement message comprising account statement data for said customer, a digital signature of said statement issuer, and a copy of said statement issuer certificate; and transmitting said customer statement message from said statement issuer to said customer using said communications network.

38. The program storage device of claim 37 wherein said statement issuer certificate comprises a first certificate issuer certificate.

39. The program storage device of claim 38 wherein said first certificate issuer certificate comprises a digital signature of a certification authority.

40. The program storage device of claim 37 wherein said first certificate issuer is a certificated bank.

41. The program storage device of claim 37 wherein said second certificate issuer is a certificated bank.

42. The program storage device of claim 37 wherein said statement issuer is a biller.

43. The program storage device of claim 37 wherein said statement issuer certificate comprises data related to said statement issuer and wherein said digital signature of said first certificate issuer comprises an encrypted message digest of said data related to said statement issuer.

44. The program storage device of claim 43 wherein said data related to said statement issuer comprises an identification number for said statement issuer.

45. The program storage device of claim 44 wherein said data related to said statement issuer comprises a public key of said statement issuer.

46. The program storage device of claim 43 wherein said encrypted message digest is encrypted using a private key of said first certificate issuer.

47. The program storage device of claim 43 wherein said statement issuer certificate comprises a first certificate issuer certificate, wherein said first certificate issuer certificate comprises a digital signature of a certification authority, and wherein said first certificate issuer certificate comprises data related to said first certificate issuer and wherein said digital signature of said certification authority comprises an encrypted message digest of said data related to said first certificate issuer.

48. The program storage device of claim 46 wherein said data related to said first certificate issuer comprises an identification number for said first certificate issuer.

49. The program storage device of claim 48 wherein said data related to said first certificate issuer comprises a public key of said first issuer.

50. The program storage device of claim 37 wherein said customer certificate comprises data related to said customer and wherein said digital signature of said certificate issuer or said second certificate issuer comprises an encrypted message digest of said data related to said customer.

51. The program storage device of claim 50 wherein said data related to said customer comprises an identification number for said customer.

52. The program storage device of claim 51 wherein said data related to said customer comprises a public key of said customer.

53. The program storage device of claim 50 wherein said encrypted message digest is encrypted using a private key of said first certificate issuer or said second certificate issuer.

54. The program storage device of claim 37 wherein said method further comprises:

receiving said customer statement message transmitted from said statement issuer to said customer;

verifying an authenticity of said copy of said statement issuer certificate included in said customer statement message; and verifying an authenticity of said account statement data by verifying said statement issuer digital signature included in said customer statement message.

55. The program storage device of claim 54 wherein said statement issuer certificate comprises data related to said statement issuer, and wherein said digital signature of said first certificate issuer comprises an encrypted first message digest of said data related to said statement issuer.

56. The program storage device of claim 55 wherein said verifying an authenticity of said copy of said statement issuer certificate comprises:

decrypting said digital signature of said first certificate issuer using a public key of said first certificate issuer to obtain an unencrypted first message digest of said data related to said statement issuer;

deriving a second message digest of said data related to said statement issuer included in said copy of said statement issuer certificate included in said customer statement message received by said customer; and comparing said first message digest and said second message digest.

57. The program storage device of claim 54 wherein said digital signature of said statement issuer comprises an encrypted first message digest of said account statement data for said customer and wherein said verifying an authenticity of said account statement data is performed by verifying said statement issuer digital signature included in said customer statement message comprises:

deriving a second message digest of said account statement data for said customer included in said customer statement message; and comparing said first message digest and said second message digest.

58. The program storage device of claim 37 wherein said customer statement message comprises an electronic mail message.

59. The program storage device of claim 54 further comprising displaying said customer statement message on a display screen.

60. The program storage device of claim 59 wherein said method further comprises sending a notification message to said statement issuer notifying said statement issuer that said customer statement message has been displayed.

61. The program storage device of claim 59 wherein said customer statement message comprises link activation information displayed as a link activation area when said customer statement message is displayed on said display screen.

62. The program storage device of claim 61 wherein activation of said link activation area activates a communication to a server computer using said communications network.

63. The program storage device of claim 62 wherein said server computer provides additional customer account statement data to said customer in response to said communication.

64. The program storage device of claim 62 wherein said server computer provides advertising data to said customer in response to said communication.

65. The program storage device of claim 64 wherein said advertising data provided by said server computer to said customer depends upon a time at which said communication is made.

66. The program storage device of claim 64 wherein said advertising data provided by said server computer to said customer depends upon a geographic location of said customer.

67. The program storage device of claim 64 wherein said advertising data provided by said server computer to said customer depends upon a parameter related to said customer.

68. The program storage device of claim 60 wherein said customer account statement data comprises amount due data and wherein said method further comprises:

displaying an electronic payment activation area on said display screen.

69. The program storage device of claim 68 wherein activating said electronic payment activation area activates an electronic payment process that may be used by said customer to pay said amount due.

\* \* \* \* \*

UNITED STATES PATENT AND TRADEMARK OFFICE
CERTIFICATE OF CORRECTION

PATENT NO. : 6,285,991 B1
DATED : September 4, 2001
INVENTOR(S) : William L. Powar It is certified that error appears in the above-identified patent and that said Letters Patent is hereby corrected as shown below:

Column 1,
Line 22, please replace "Killer)" with -- (biller) --.

Column 21,
Line 65, after "first", please insert -- certificate --.

Column 22,
Line 1, after "said", (second occurrence) please insert -- first --.

Signed and Sealed this

Tenth Day of September, 2002

*Attest:*

*Attesting Officer*

JAMES E. ROGAN
*Director of the United States Patent and Trademark Office*